(No Model.)
L. W. RHOADES.
VELOCIPEDE.
No. 455,058. Patented June 30, 1891.
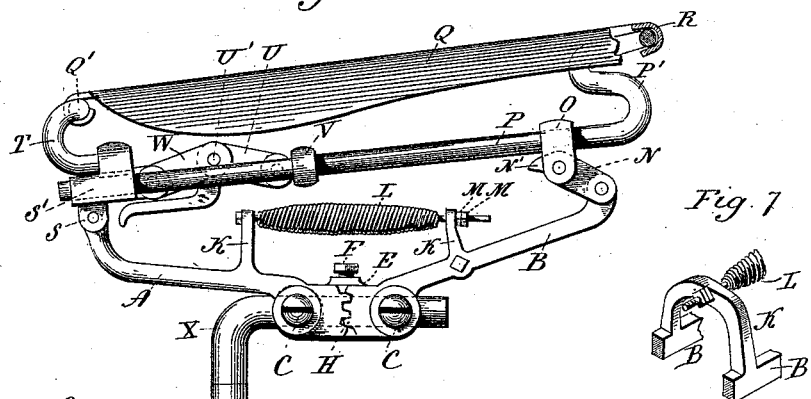
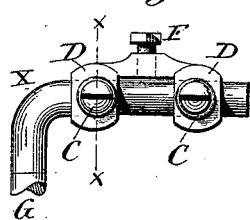
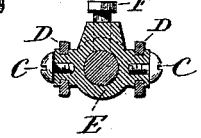
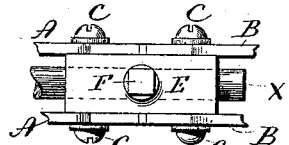
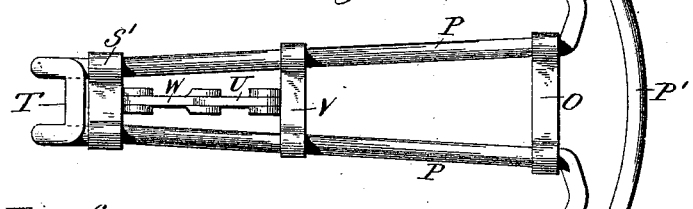
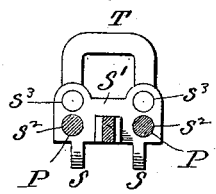
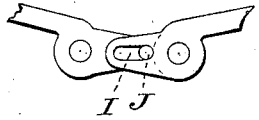
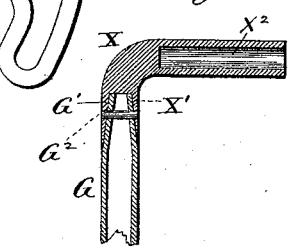
Witnesses
J. H. Shumway
L. D. Kilby
Leonard W. Rhoades
Inventor
By Attys
Earle Seymour
THE NORRIS PETERS CO., PHOTO-LITHO., WASHINGTON, D. C.

UNITED STATES PATENT OFFICE.

LEONARD W. RHOADES, OF NORTHAMPTON, ASSIGNOR TO THE OVERMAN WHEEL COMPANY, OF CHICOPEE FALLS, MASSACHUSETTS.

VELOCIPEDE.

SPECIFICATION forming part of Letters Patent No. 455,058, dated June 30, 1891.

Application filed January 19, 1891. Serial No. 378,233. (No model.)

*To all whom it may concern:*

Be it known that I, LEONARD W. RHOADES, of Northampton, in the county of Hampshire and State of Massachusetts, have invented a new Improvement in Velocipedes; and I do hereby declare the following, when taken in connection with accompanying drawings and the letters of reference marked thereon, to be a full, clear, and exact description of the same, and which said drawings constitute part of this specification, and represent, in—

Figure 1, a view in side elevation of a saddle constructed in accordance with my invention; Fig. 2, a detached plan view of the frame thereof, together with the movable perch-block and the toggle mechanism for moving the same; Fig. 3, a detached view in side elevation of the adjustable head mounted upon the saddle-post with the pivotal arms removed; Fig. 4, a view in transverse section on line $xx$ of Fig. 3 with the pivotal arms in place; Fig. 5, a broken plan view of the said head. Fig. 6 is a detached view in inside elevation of the movable perch-block and the forward perch which it carries; Fig. 7, a detached broken view in perspective, showing the yoke for joining the inner ends of the forward pivotal arms; Fig. 8, a detached sectional view of the saddle-post, showing my improved joint; and Fig. 9, a broken view in side elevation, showing another mode of flexibly connecting the inner ends of the pivotal arm for their coaction.

My invention relates to an improvement in velocipedes, the object being to produce a saddle adapted to cushion under the weight of the rider, to have its rear and forward ends vertically adjusted independently, and to have its seat removed and attached at pleasure, and, further, to provide for a neat, stiff, and inexpensive joint between tubular and solid parts.

With these ends in view my invention consists, first, in a saddle having forward and rear pivotal arms flexibly connected at their inner ends for coaction, and, second, in a joint composed of a cylindrical solid part formed with a tapering socket and a very thin edge, and a tube having its end tapered and adapted to fit entirely within the said socket in which it is brazed, and the said parts being fitted and finished so that the thin edge of the solid part merges in a straight line into the full diameter of the tube to form an invisible joint.

My invention further consists in certain details of construction and combinations of parts, as will be hereinafter described, and pointed out in the claims.

As herein shown, my improved saddle is provided with two substantially horizontal pivotal forward arms A A and two corresponding rear arms B B, the inner ends of the said arms being pivotally attached by means of screw-studs C to flat bearings D, formed upon the opposite faces of the sliding block E, which is furnished with a set-screw F for securing it upon an L-shaped saddle-post, to be particularly described later on. The extreme inner ends of these arms are provided with teeth H, arranged on the arc of a large circle and meshing into each other, whereby the arms coact, so that as the front arms are depressed the rear arms will be correspondingly depressed, and vice versa.

If desired, instead of providing the inner ends of the pivotal arms with intermeshing teeth, as described, they may be connected, as shown by Fig. 9 of the drawings, by forming an elongated slot I in one and providing the other with a pin J, arranged to play therein. The toothed construction is, however, preferred, inasmuch as by removing either the forward or rear arms they may be re-engaged with the teeth of the other pair of arms at a different inclination therewith, whereby the normal vertical adjustment of the rear and forward ends of the saddle may be varied, as desired. Each pair of arms is provided with an upright transverse yoke K, located near their inner ends and rigidly connecting them, so that they act as one arm. If desired, however, the arms of each pair may be left free to act independently of each other. A spring L, connecting the upper ends of the said yokes K, and made adjustable for tension by means of nuts M M, exerts a constant effort to elevate the outer ends of the arms of both pairs, the arms being depressed under weight against its tension. The spring therefore controls the pivotal action of the arms. If desired, more than one spring may be employed, and in this case it is not necessary that the two pairs of arms should be directly coupled together by them, as shown herein. The outer ends of the rear pivotal arms B B are provided with links N N, the inner ends whereof are pivotally connected with a transverse strap O, rigidly secured to the two horizontal and nearly parallel members P P of a saddle-frame composed of a heavy piece of wire bent at its rear end to form a perch P' for the rear end of the flexible cover or seat Q, which is provided within its rear end with a longitudinally-bowed piece of sheet metal R, of U-shaped cross-section, whereby it is adapted to be attached to and removed from the said perch P' at pleasure. The extreme inner ends of the links N are shaped to form stops N', which engage with the under edges of the frame members P P and arrest the depression of the said saddle-frame. The outer ends of the forward pivotal arms A A are respectively pivoted to two lugs S S, depending from the lower face of a perch-block S', which is mounted so as to be longitudinally movable upon the extreme forward ends of the frame members P P, being thereto provided with two horizontal openings $S^2$ $S^2$ to receive the same. The said block is also provided above the openings $S^2$ $S^2$ with two corresponding openings $S^3$ $S^3$, into which the ends of the forward perch T are inserted and rigidly secured by brazing. A hook Q', secured to the forward end of the cover or seat Q, is adapted to be readily engaged with and disengaged from the said perch. A toggle-lever U, pivoted at its rear end to a heavy transverse strap V, uniting the two frame members P P, is connected by a pivot U' to a link W, which is pivoted to the inner end of the perch-block S'. In the open position of the toggle-lever U the said pivot U' stands above the frame members P P, which lie in the line of the strain exerted by the flexible cover or seat when the same is under tension; but when the toggle-lever is in its closed position the said pivot U' stands below the said members and therefore below the said line, and is so held by the tension of the cover or seat, whereby the perch-block S is locked in its forward adjustment. By lifting the toggle-lever into its open position the perch-block S is permitted by the pivotal arms A A and B B to move rearwardly upon the members P P of the saddle-frame, and thus slacken the tension of the cover or seat Q, which may then be removed or replaced at pleasure. After the said cover has been replaced it is drawn to the required tension by pushing the outer end of the toggle-lever U down, whereby the perch-block S is moved forward and held, as described.

My improved joint is formed by tapering the end of a tube by forging or swaging, or in some other way not involving the removal of material, and inserting it into a socket of corresponding taper formed in a solid part having a very thin edge. As herein shown, it is utilized in the construction of the L-shaped saddle-post, which consists of two parts G and X, the former being made tubular and straight and the latter solid and angular. The upper end of the part G is tapered, as at G', and inserted and brazed into a socket X' of corresponding taper, formed in the part X, which has a very thin edge; but preparatory to brazing and to hold the tapered end of the tube in the said socket during that operation the two parts are secured together by a pin $G^2$. The outer end of the part X is bored out, as at $X^2$, to lighten it; but it is left solid where it is bent, the greatest strain coming at that point. After the parts have been brazed together their exterior surfaces are filed smooth at the joint, so that the edge of the solid part will merge into the full diameter of the tube. The joint thus formed is practically invisible when the work is done, and very strong, as no material is removed from the tube except what little may be taken off in filing them, as described. The joint is also very easily and cheaply made. This principle of joining tubular and solid parts is not limited to saddle-posts, but may be widely applied in cycle construction.

The spring L is adjusted in tension according to the weight of the rider, so that it will yield to permit the arms to work with the best effect. By using the said pivotal arms and flexibly connecting them together, so that they move correspondingly, and controlling their action by means of one or more springs, a saddle is secured which is not only very easy to ride, as it cushions freely, but also adjustable to a variety of requirements involving the weight of the rider and his preferences as to its horizontal inclination. I would have it understood, in view of the changes suggested herein, that I do not limit myself to the exact construction shown and described, but hold myself at liberty to make such changes and alterations as fairly fall within the spirit and scope of my invention.

I am aware that it is old to taper a tube and insert it into a corresponding socket, and therefore do not claim such a construction broadly.

Having fully described my invention, what I claim as new, and desire to secure by Letters Patent, is—

1. In a velocipede-saddle, the combination of substantially horizontal pivotal front and rear arms flexibly connected together at their inner ends for coaction, and a flexible cover or seat suspended between the outer ends of the arms, substantially as described, and whereby the movement of the front arms is duplicated in the rear arms, and vice versa.

2. In a velocipede-saddle, the combination of pivotal front and rear arms provided at their inner ends with intermeshing teeth, and a flexible cover or seat suspended between the outer ends of the said arms, substantially as described.

3. In a velocipede-saddle, the combination of pivotal front and rear arms provided at their inner ends with intermeshing teeth, one or more springs for elevating the outer ends of the arms which are depressed under weight against the tension of the said spring or springs, and a flexible cover or seat suspended between the outer ends of the arms, substantially as described.

4. In a velocipede-saddle, the combination of pivotal front and rear arms flexibly connected at their inner ends for coaction, a flexible cover or seat, a frame supported upon the outer ends of the said arms and adapted at its rear end to support the rear end of the cover, a perch for the forward end of the cover movably mounted upon the forward end of the said frame, and toggle mechanism connecting the movable perch with the said frame, substantially as described.

5. In a velocipede-saddle, the combination of two pivotal front and two pivotal rear arms flexibly connected at their inner ends for coaction, each pair of arms being provided with an upright transverse yoke rigidly connecting them, a coupling-spring uniting the said yokes for controlling the action of the pivotal arms, and a flexible cover or seat suspended between the outer ends of the said arms, substantially as described.

6. In a velocipede-saddle, the combination of pivotal front and rear arms flexibly connected at their inner ends for coaction, a head to which the said ends of the arms are pivoted, one or more springs for controlling the action of the said arms, a flexible cover or seat, a frame adapted to have the rear end of the cover detachably connected with it, links connecting the outer ends of the rear pivotal arms with the said frame, a perch-block pivoted to the outer ends of the front pivotal arms and receiving the forward end of the frame on which it is movable, a perch carried by said block and adapted to have the forward end of the cover detachably connected with it, and a toggle-lever for connecting the said movable perch-block with the frame, substantially as described.

7. In a joint for velocipede-frames, the combination, with a cylindrical solid part formed with a tapering socket and a very thin edge, of a tube having its end tapered and adapted to fit entirely within the said socket in which it is brazed, and the said parts being fitted and finished so that the thin edge of the solid part merges in a straight line into the full diameter of the tube to form an invisible joint.

8. An L-shaped saddle-post composed of a straight tubular and a bent solid part, one end of the tube being tapered and one end of the solid part being formed with a corresponding socket, into which the tapered end of the tube is inserted and brazed, substantially as described.

In testimony whereof I have signed this specification in the presence of two subscribing witnesses.

LEONARD W. RHOADES.

Witnesses:
LUTHER WHITE,
DELLA HUBBARD.